UNITED STATES PATENT OFFICE.

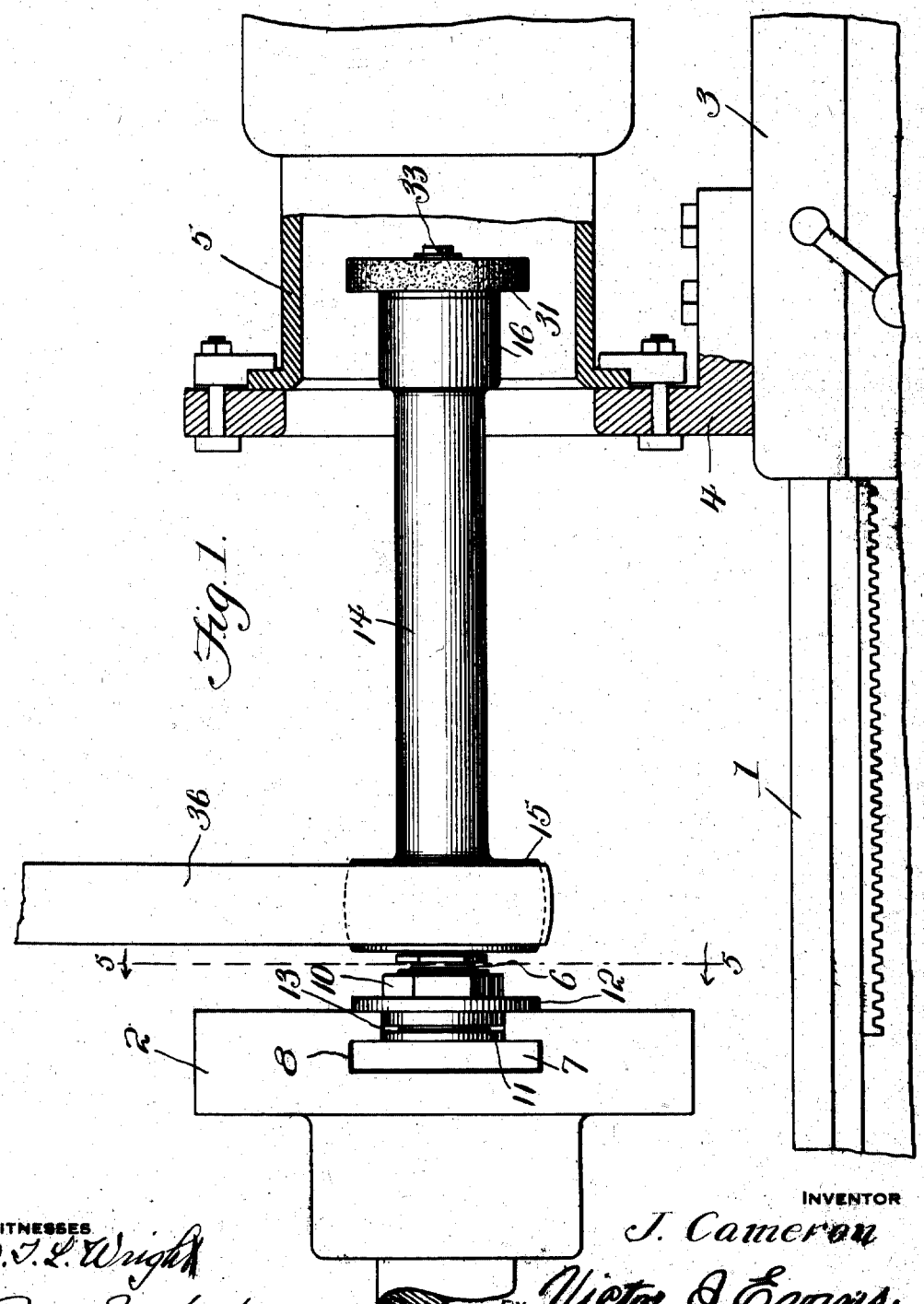

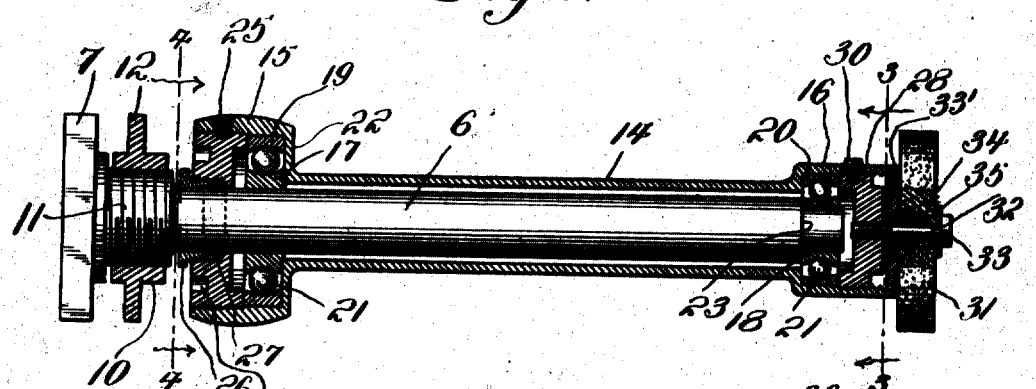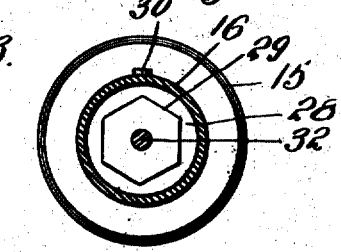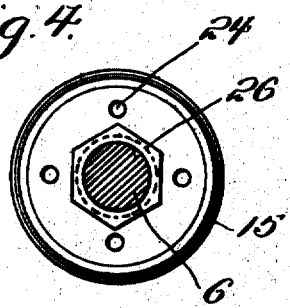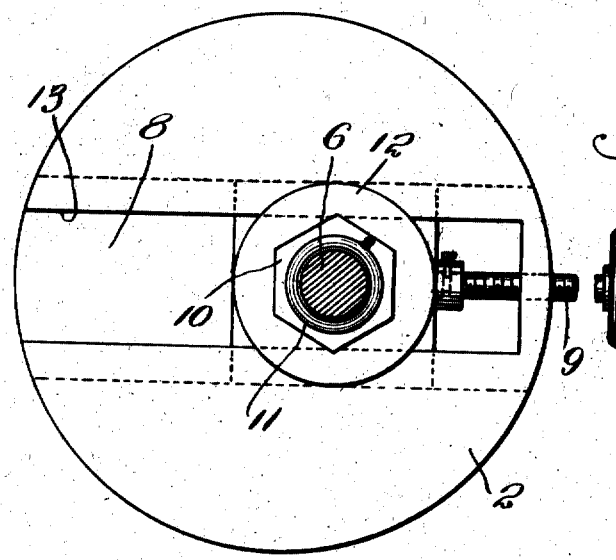

JAMES CAMERON, OF VICTORIA, BRITISH COLUMBIA, CANADA.

CYLINDER-GRINDER.

1,278,588.  Specification of Letters Patent.  Patented Sept. 10, 1918.

Application filed March 20, 1917. Serial No. 156,181.

*To all whom it may concern:*

Be it known that I, JAMES CAMERON, a British subject, residing at Victoria, in the Province of British Columbia and Dominion of Canada, have invented new and useful Improvements in Cylinder-Grinders, of which the following is a specification.

This invention comprehends improvements in grinding attachments for lathes and relates particularly to cylinder grinders.

One of the objects of the invention is to provide a cylinder grinder which may be attached to a common type of lathe and which will accurately and at a high speed grind a cylinder to the desired diameter.

Another object of the invention resides in the provision of a cylinder grinder having a spindle adjustably attachable to the face plate or head stock of a lathe and supporting on ball or roller bearings a sleeve which may be rotatably driven by any suitable means and which carries the carborundum or emery grinding wheel.

With these and other objects in view as will become more apparent as the description proceeds, the invention consists in certain novel features of construction, combination and arrangement of parts as will be hereinafter fully described, illustrated and claimed.

In the drawings,

Figure 1 is a side elevation of my cylinder grinder showing the head connected to the head stock of a lathe.

Fig. 2 is a longitudinal sectional view, partly in elevation through the grinder.

Fig. 3 is a transverse section on the plane of line 3—3 of Fig. 2.

Fig. 4 is a section on the plane of line 4—4 of Fig. 2, and

Fig. 5 is a section on the plane of line 5—5 of Fig. 1.

Referring in detail to the drawings by numerals, 1 designates a lathe of ordinary construction having a face plate or head stock 2, a carriage 3 and angle plate or work holder 4 to which a cylinder 5 may be attached for grinding purposes.

The cylinder grinder or grinding attachment comprises a spindle 6 having a squared driving or attaching plate 7 formed on one end thereof for reception in the channel 8 extending transversely across the head stock as shown. Any suitable means such as the threaded shaft or screw 9 may be provided for adjusting the position of the spindle on the head stock. To lockingly secure the spindle on the head stock, I provide a nut 10 threadingly engaged with the enlarged threaded portion 11 of the spindle and having a flange 12 adapted to clamp against the head stock. The nut is provided on one side of the flange 12 with wrench engaging faces and is circular on the other side of the flange 12 and of such a diameter as to accurately fit within the entrance opening 13 of the channel 8.

A sleeve 14 encircles the cylinder and is enlarged at one end to form a hollow driving pulley 15 and is enlarged adjacent its other end to form a cylindrical housing 16. A pair of races 17 and and 18 are rigidly secured to form race ways for the ball bearings 21. Of course, roller bearings may be used instead of ball bearings if desired. The race 17 engages the flange or circular wall and the race way 18 engages the shoulder 23 formed by reducing the diameter of the spindle adjacent its outer end.

A circular locking nut having a central opening for the passage of the spindle and externally threaded for engagement with the internally threaded pulley is threaded within said pulley by a spanner wrench or other suitable means engaging in the openings 24 and engages the outer race 19 to hold it securely in position. The nut may be held securely in position by means of the locking screw 25. A packing gland 26 threads into the outer end of the spindle opening through the nut and engages a felt washer 27 as shown.

A circular lock nut 28 is provided by the other end of the grinder and is externally threaded for engagement with the internally threaded housing 16 into which it may be screwed by a suitable runner engaging the wrench faces 29. The nut may be held in engagement with the race 20 by a lock screw 30.

A grinding wheel 31 is secured to the end of the sleeve 14 by a screw bolt 32 which is threaded into the nut 29 and which is provided with a head 33. A washer 33' of relatively soft material is interposed between the emery wheel and the end of the sleeve. This washer is recessed peripherally adjacent its inner face to provide a recess into which the end of the housing 16 extends and is also provided centrally with a boss or flange which fits into the central opening of the grinding wheel. A bushing 34 fits into the emery wheel from its outer face and is formed with a peripheral flange 35 which engages the face of the emery wheel and is held thereagainst by the head of the bolt 32. The washer 33' and the bushing 34 being of relatively soft metal or of fiber and accurately formed to project into the central opening of the emery wheel insures accuracy in the mounting thereof.

Lubricant may be injected into the sleeve through the bolt opening in the nut 28 and is prevented from escaping from the sleeve at the other end by the washer 27 and packing gland 26.

In operation of the grinder, it is first secured eccentrically to the head stock of the lathe and rotated at a relatively low speed by said head stock, while the sleeve carrying the emery wheel is rotated at a comparatively high speed by the belt 36 which may be driven by the counter shaft of the lathe. This method of grinding and finishing the cylinders with the emery wheel rotated at a high rate of speed forms a tough skin on the interior of the cylinder which is very desirable.

It will be understood that my invention may be used as an attachment to a lathe or may be built in the machine itself and furthermore that a battery of grinding elements may be used if desired for simultaneously grinding the cylinders of an engine. By running the sleeve at a lower rate of speed than when used for grinding, the device may be used as a boring instrument.

From the foregoing description, taken in connection with the accompanying drawings, it will be evident that I have provided a very simple, practical and efficient cylinder grinder which possesses relatively few parts and which therefore may be manufactured at a comparatively low cost.

While I have shown and described the preferred embodiments of my invention it will be clearly understood that I do not wish to be limited to this construction but may make such changes as will fall within the scope and spirit of the invention as claimed.

What I claim is:—

1. In a cylinder grinder a spindle and sleeve encircling said spindle, a hollow pulley formed on one end of the sleeve, a housing formed on the other end of the sleeve, a race secured rigidly to the spindle, a second race coöperating with said first mentioned race, bearing elements interposed between said races, a locking nut threaded into the pulley for holding the second mentioned race firmly in position, a race secured to the spindle adjacent its outer end, a second race mounted in the housing and coöperating with the last mentioned race, bearing elements between the second pair of races, a locking nut threaded into the housing for holding the third mentioned race in position, and a grinding wheel secured to the last mentioned nut.

2. In a cylinder grinder of the character described, a spindle adapted for attachment to a lathe, a sleeve encircling said spindle, a pulley formed integrally on the inner end of the sleeve, a housing formed integrally on the outer end of the sleeve, bearing elements interposed between the spindle and sleeve, nuts threaded into the pulley and into the housing for holding the bearing elements properly in position, a grinding wheel, a threaded bolt mounting said grinding wheel on the last mentioned nut and a washer interposed between the grinding wheel and the end of the housing, said washer being formed with a central circular flange projecting into the grinding wheel.

3. A cylinder grinder comprising a spindle adapted for attachment to the head stock of a lathe, means for locking said spindle to the head stock, a sleeve encircling said spindle, a hollow pulley formed on the sleeve adjacent the lathe end thereof, an anti-friction device interposed between said pulley and the spindle, means threaded into position, a housing for holding the anti-friction device in position, a housing formed integral on the other end of the sleeve, an anti-friction device interposed between said housing and spindle, a nut threaded into the housing for holding the last mentioned anti-friction device in position, an emery wheel having a central opening, a bolt extending through said central opening and secured to the last mentioned nut, a disk washer interposed between the emery wheel and the housing formed with a central outwardly projecting member fitting into the emery wheel and a bushing mounted on said bolt and extending into the emery wheel through the outer face thereof.

In testimony whereof I affix my signature.

JAMES CAMERON.